United States Patent
Thompson

Patent Number: 5,983,831
Date of Patent: Nov. 16, 1999

[54] CAT LITTER BOX CLEANING SYSTEM

[76] Inventor: Nicole L. Thompson, 1252 Park Western Dr. #92, San Pedro, Calif. 90732

[21] Appl. No.: 09/061,203
[22] Filed: Apr. 16, 1998
[51] Int. Cl.⁶ .................................................. A01K 29/00
[52] U.S. Cl. .......................... 119/165; 119/161; 119/166
[58] Field of Search ..................... 119/161, 165, 119/166, 168; 209/251, 374

[56] References Cited

U.S. PATENT DOCUMENTS

| | | | |
|---|---|---|---|
| 1,390,455 | 9/1921 | McCollom | 209/374 |
| 3,100,474 | 8/1963 | Schneider | 119/166 |
| 3,796,188 | 3/1974 | Bradstreet | 119/166 |
| 4,602,593 | 7/1986 | Gross | 119/166 |
| 5,806,461 | 9/1998 | Kiera | 119/165 |

Primary Examiner—Michael J. Carone
Assistant Examiner—Son T. Nguyen

[57] ABSTRACT

A cat litter box system is provided including a pair of boxes each with an open top and an open bottom. Each box further has a meshed screen coupled thereto and a closed planar plate slid within a slot formed in a face of the associated box.

1 Claim, 3 Drawing Sheets

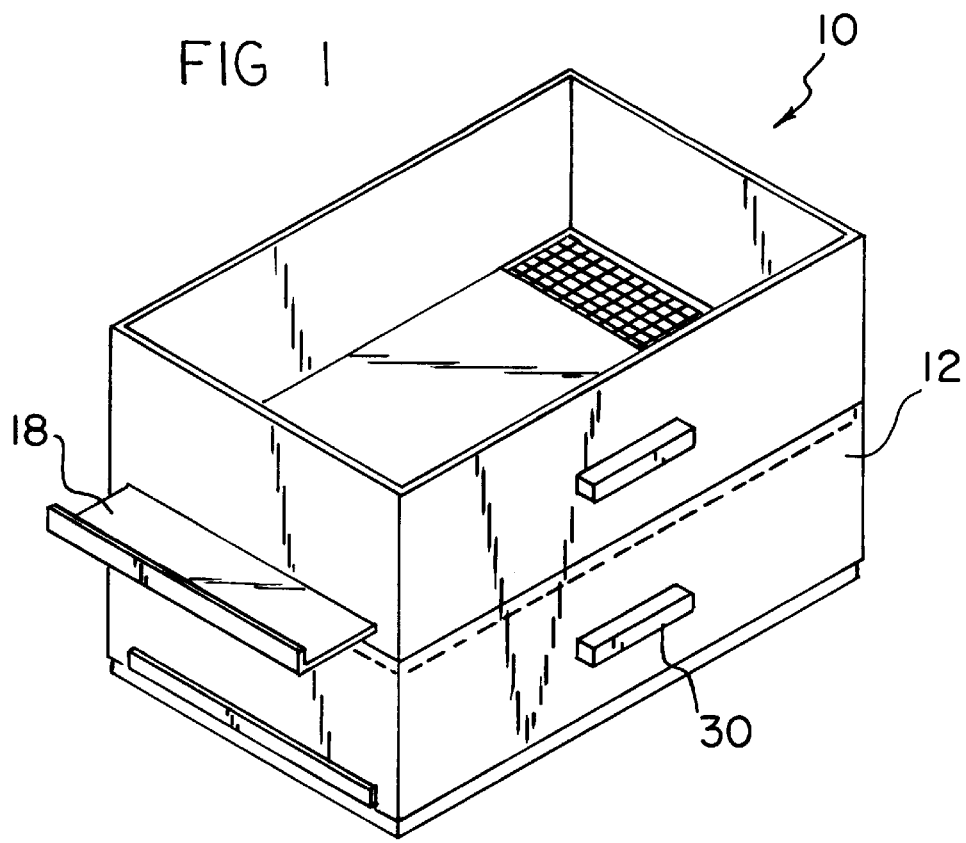
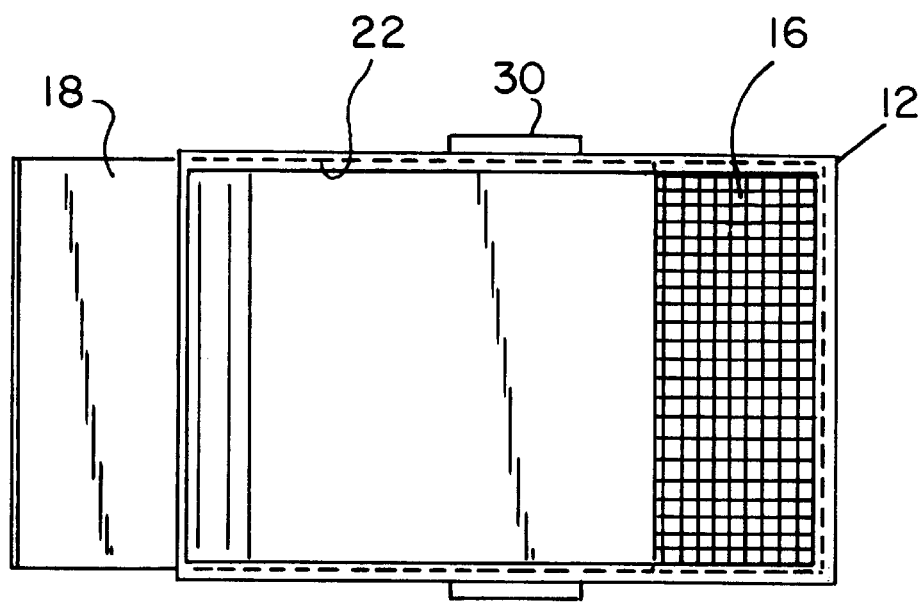

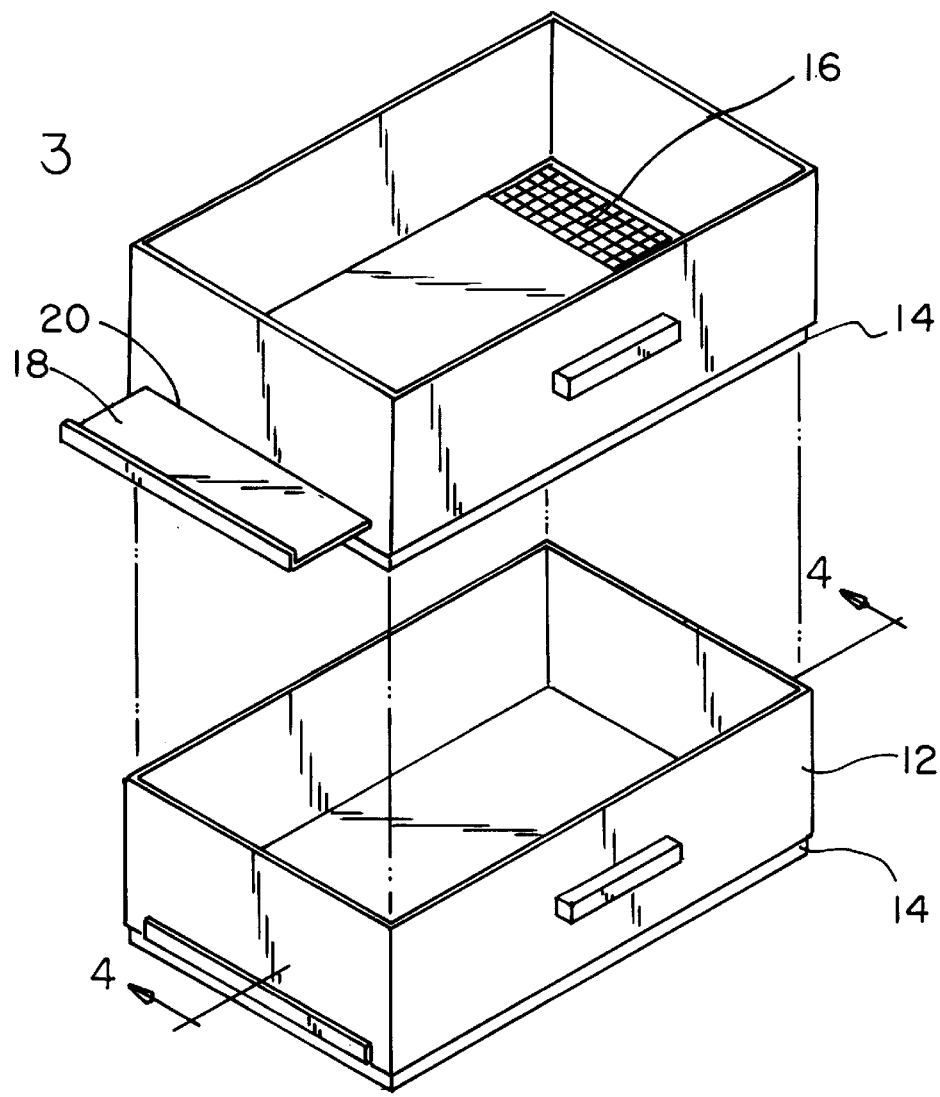
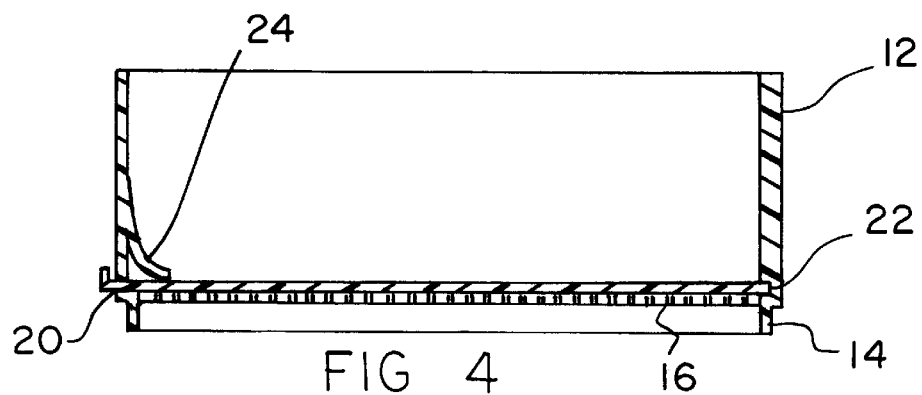

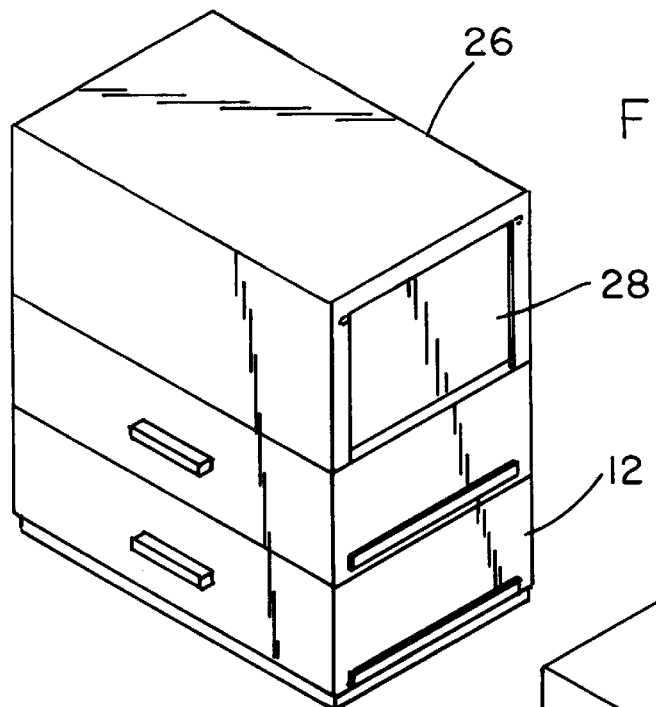
FIG 5
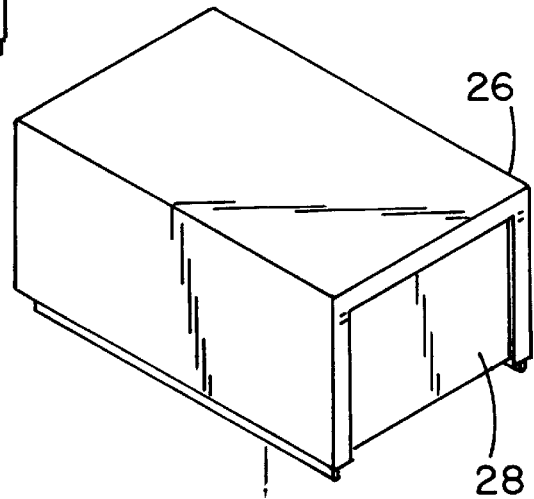
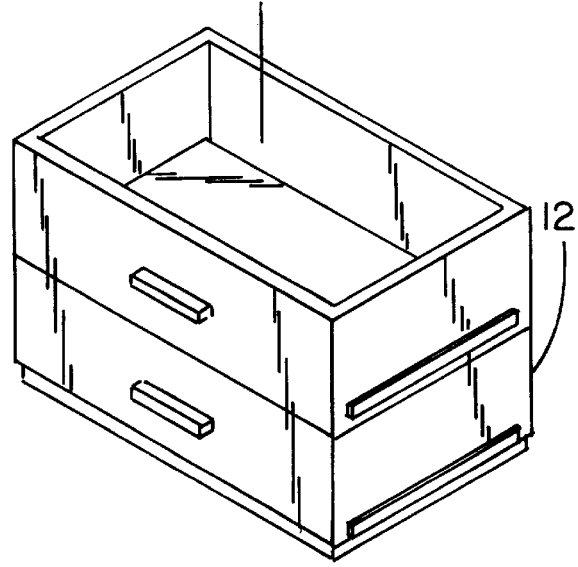
FIG 6

CAT LITTER BOX CLEANING SYSTEM

BACKGROUND OF THE INVENTION

1. Field of the Invention

The present invention relates to cat litter boxes and more particularly pertains to a new cat litter box cleaning system for conveniently and quickly cleaning a litter box.

2. Description of the Prior Art

The use of cat litter boxes is known in the prior art. More specifically, cat litter boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art cat litter boxes include U.S. Pat. No. 3,908,597; U.S. Pat. No. 5,363,808; U.S. Pat. No. 4,602,593; U.S. Pat. No. 5,419,282; U.S. Pat. No. 4,325,822; and U.S. Pat. No. Des. 351,693.

In these respects, the cat litter box cleaning system according to the present invention substantially departs from the conventional concepts and designs of the prior art, and in so doing provides an apparatus primarily developed for the purpose of conveniently and quickly cleaning a litter box.

SUMMARY OF THE INVENTION

In view of the foregoing disadvantages inherent in the known types of cat litter boxes now present in the prior art, the present invention provides a new cat litter box cleaning system construction wherein the same can be utilized for conveniently and quickly cleaning a litter box.

The general purpose of the present invention, which will be described subsequently in greater detail, is to provide a new cat litter box cleaning system apparatus and method which has many of the advantages of the cat litter boxes mentioned heretofore and many novel features that result in a new cat litter box cleaning system which is not anticipated, rendered obvious, suggested, or even implied by any of the prior art cat litter boxes, either alone or in any combination thereof.

To attain this, the present invention generally comprises a pair of boxes each having a rectangular peripheral side wall. Such side wall includes a pair of elongated rectangular side faces and a pair of short rectangular end faces. As such, an open top and an open bottom are defined along with an upper peripheral edge and a lower peripheral edge. The lower peripheral edge of the side wall of each box has a downwardly extending rectangular lip integrally coupled thereto. The lip of each box depends therefrom and is spaced inwardly from an outer surface of the box. As shown in the Figures, the side faces of each box have a handle strip mounted thereon at a central extent thereof. In use, the boxes may be removably stacked on each other. The pair of boxes each further have an integral mesh screen coupled to the lower peripheral edge thereof in perpendicular relationship with the side wall. A closed planar rectangular plate is also included with an area equal to that encompassed by the side wall. Each plate serves to be slid within a rectangular slot formed in one of the end faces of the associated box just above the screen. As best shown in FIG. 4, each box further includes an arcuate elastomeric scraper with a width equal to that of the corresponding end face of the box. Each scraper has a top edge mounted on an interior surface of the associated end face. A lower edge of each of the scrapers slidably abuts a top surface of the plate. As shown in FIG. 1, each plate has an upwardly extending lip coupled along an end edge thereof for gripping purposes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cat litter box cleaning system apparatus and method which has many of the advantages of the cat litter boxes mentioned heretofore and many novel features that result in a new cat litter box cleaning system which is not anticipated, rendered obvious, suggested, or even implied by any of the prior art cat litter boxes, either alone or in any combination thereof.

It is another object of the present invention to provide a new cat litter box cleaning system which may be easily and efficiently manufactured and marketed.

It is a further object of the present invention to provide a new cat litter box cleaning system which is of a durable and reliable construction.

An even further object of the present invention is to provide a new cat litter box cleaning system which is susceptible of a low cost of manufacture with regard to both materials and labor, and which accordingly is then susceptible of low prices of sale to the consuming public, thereby making such cat litter box cleaning system economically available to the buying public.

Still yet another object of the present invention is to provide a new cat litter box cleaning system which provides in the apparatuses and methods of the prior art some of the advantages thereof, while simultaneously overcoming some of the disadvantages normally associated therewith.

Still another object of the present invention is to provide a new cat litter box cleaning system for conveniently and quickly cleaning a litter box.

Even still another object of the present invention is to provide a new cat litter box cleaning system that includes a pair of boxes each with an open top and an open bottom. Each box further has a meshed screen coupled thereto and a closed planar plate slid within a slot formed in a face of the associated box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new cat litter box cleaning system according to the present invention.

FIG. 2 is a bottom view of the present invention.

FIG. 3 is an exploded view of the present invention.

FIG. 4 is a side cross-sectional view of the present invention taken along line 4—4 shown in FIG. 3.

FIG. 5 is a perspective view of the present invention with the cover in place.

FIG. 6 is a perspective view of the present invention with the cover removed.

DESCRIPTION OF THE PREFERRED EMBODIMENT

With reference now to the drawings, and in particular to FIGS. 1 through 6 thereof, a new cat litter box cleaning system embodying the principles and concepts of the present invention and generally designated by the reference numeral 10 will be described.

The present invention, designated as numeral 10, includes a pair of identical boxes 12 each having a rectangular peripheral side wall 12. Such side wall includes a pair of elongated rectangular side faces and a pair of short rectangular end faces. As such, an open top and an open bottom are defined along with an upper peripheral edge and a lower peripheral edge.

The lower peripheral edge of the side wall of each box has a downwardly extending rectangular lip 14 integrally coupled thereto. The lip of each box depends therefrom and is spaced inwardly from an outer surface of the box. Ideally, the lips have a height which is less than 1/10 that of the associated box. As shown in the Figures, the side faces of each box have a horizontally oriented linear handle strip 30 mounted thereon at a central extent thereof. In use, the boxes may be removably stacked on each other.

The pair of boxes each further have a mesh screen 16 coupled to the lower peripheral edge thereof in perpendicular relationship with the side wall. Each opening in the screen is preferably slightly greater than a couple of grains of conventional cat litter. A closed planar rectangular plate 18 is also included with an area equal to that encompassed by the side wall. Each plate serves to be slid within a rectangular slot 20 formed in one of the end faces of the associated box just above the screen. As shown in FIG. 1, each plate has an upwardly extending lip coupled along an end edge thereof for gripping purposes. Preferably, the plate is further slidable within a rectangular recess 22 formed about an entire perimeter of an interior surface of the side wall.

As best shown in FIG. 4, each box further includes a flexible elastomeric scraper 24 with a width equal to that of the corresponding end face of the box. Each scraper preferably defines a portion of a cylinder and has a top edge integrally mounted on the interior surface of the associated end face. A lower edge of each of the scrapers slidably abuts a top surface of the plate of the corresponding box.

Finally, a top cover 26 has a rectangular top face and an end face and a pair of side faces integrally coupled thereto and extending downwardly therefrom. The top cover thus has an open bottom face and an open end face. See FIGS. 5 & 6. A lower peripheral edge of the end face and side faces of the top cover has a downwardly extending rectangular lip integrally coupled thereto similar to that of the boxes. The top cover is thus adapted for being removably engaged with the upper peripheral edge of one of the boxes. As shown in FIGS. 5 & 6, the top cover further has a square door 28 hingably coupled along a top edge of the open end face for allowing the entrance of a cat. The top cover is suitably equipped with a height which is about twice that of the boxes.

In use, a top one of the boxes may be filled with litter and used. When full, the associated plate may be removed for allowing the litter to sift to a lower one of the boxes. After this, the top box is emptied and placed beneath the remaining box for continued use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cat litter box system comprising, in combination:
   a pair of boxes each having a rectangular peripheral side wall including a pair of elongated rectangular side faces and a pair of short rectangular end faces defining an open top and an open bottom defined respectively by an upper peripheral edge and a lower peripheral edge, the lower peripheral edge of the side wall of each box having a downwardly extending rectangular lip integrally coupled thereto and depending therefrom and spaced inwardly from an outer surface of the box, each of the side faces of each box having a handle strip mounted thereon at a central extent thereof for permitting lifting of one of the boxes off of the other of the boxes, whereby the boxes may be removably stacked on each other;

said pair of boxes each further having an integral mesh screen coupled to the lower peripheral edge thereof in perpendicular relationship with the side wall and a closed planar rectangular plate with an area equal to that encompassed by the side wall, each plate adapted to be slid through a rectangular slot formed in one of the end faces of the associated box just above the screen, each box further including a flexible elastomeric scraper with a width equal to that of the corresponding end face of the box, each scraper having a top edge mounted on an interior surface of the associated end face and a lower edge positioned adjacent to and slidably abutting against a top surface of the plate, wherein the scraper has an arcuate upper surface with a lower edge portion oriented substantially parallel to the top surface of the plate for lifting litter resting on the top surface and an upper edge portion oriented substantially perpendicular to the top surface for turning litter resting on the top surface, wherein each plate has an upwardly extending lip coupled along an end edge thereof for gripping purposes; and a top cover having a rectangular top face and an end face and a pair of side faces integrally coupled thereto and extending downwardly therefrom for defining an open bottom face and an open end face, a lower peripheral edge of the end face and side faces of the top cover having a downwardly extending rectangular lip integrally coupled thereto and depending therefrom and spaced inwardly from an outer surface of the top cover for being removably engaged with the upper peripheral edge of one of the boxes, the top cover further having square door hingably coupled along a top edge of the open end face for allowing the entrance of a cat, the top cover having a height between the open bottom and the top face and being twice the height of between the open top and open bottom each of said.

\* \* \* \* \*